Patented June 5, 1945

2,377,390

UNITED STATES PATENT OFFICE 2,377,390

RACEMIZATION OF α-HYDROXY-β,β-DI-METHYL-GAMMA-BUTYROLACTONE

John Weijlard, Westfield, and John Paul Messerly, Clark Township, Union County, N. J., assignors to Merck & Co., Inc., Rahway, N. J., a corporation of New Jersey No Drawing. Application September 5, 1942, Serial No. 457,514

15 Claims. (Cl. 260—344)

This invention relates generally to improvements in processes for the preparation of organic chemical compounds and in a more particular sense is concerned with a method for converting an optical isomer into a racemic mixture of optical isomers.

In the synthesis of organic chemical compounds that exist in enantiomorphous forms, both of the isomers normally are formed, usually in substantially equal quantities. This phenomenon acquires especial significance in industrial operations when one of the optical isomers of the substance synthesized is valuable and the other is substantially worthless, as for instance, pantothenic acid, the dextro-rotatory-form of which is physiologically useful, whereas the laevo-rotatory-form does not possess this utility.

Physiologically active pantothenic acid, the dextro-rotatory form, is prepared by condensation of a β-alanine derivative with laevo-rotatory α-hydroxy-β,β-dimethyl-gamma - butyrolactone; condensation of the β-alanine derivative with the dextrorotatory lactone yields a physiologically inactive product. The lactone is prepared by synthetic methods, accordingly a need has been felt for utilization of the presently useless dextro-rotatory form, preferably by conversion, wholly or partially, to the useful laevo-rotatory form.

In the past attempts have been made to convert pure enantiomorphs into racemic mixtures of the enantiomorphous forms by continued heating at elevated temperatures and/or in certain instances, treatment with strong alkalis. These methods, when applied to dextro-rotatory α - hydroxy-β, β-dimethyl-gamma-butyrolactone, have proven unsatisfactory because of the small yields of desired product obtained and because of the relatively large investment in costly high-pressure equipment required.

The present invention is concerned with a method for converting dextro-rotatory α-hydroxy-β,β-dimethyl-gamma-butyrolactone into a racemic mixture of the enantiomorphous forms. In accordance with this invention, the dextro-rotatory lactone is converted to a racemic mixture by heating the same, under reflux, with an alkali metal carbonate or alkaline earth hydroxide. A satisfactory degree of racemization is obtained when the reaction mixture is heated at a temperature somewhat above the boiling point of water and preferably below the boiling point of the lactone, say a temperature of the order of 125° C. The period of heating, broadly considered, is proportional to the degree of racemization attained. Periods of less than about twelve hours give yields distinctly less satisfactory than those obtained where the reaction mixture is heated twelve hours or more. The treatment does not require specialized equipment such as a high-pressure kettle, and the yield of desired product is sufficiently high to make the process of commercial significance.

The following examples illustrate methods of carrying out the present invention but it is to be understood that these examples are given by way of illustration and not of limitation.

Example 1

About 32.5 g. of crude dextro-rotatory α-hydroxy-β,β-dimethyl-gamma-butyrolactone $$(\alpha)_{30}^{D} \cdot +16.9°$$

mixed with approximately 17.5 g. anhydrous potassium carbonate, are heated at about 125° C. for approximately 12 hours, cooled, about 50 cc. of water are added and the mixture is acidified with dilute hydrochloric acid, using Congo red as an indicator. After heating on a steam bath for about one hour, the mixture is then concentrated to dryness under vacuum, extracted with approximately 100 cc. of acetone, filtered, and further extracted with three 50 cc. portions of acetone. The combined acetone filtrates are then concentrated in vacuo upon a steam bath. Yield, about 27.9 g. α-hydroxy-β,β-dimethyl-gamma-butyrolactone, $$(\alpha)_{27}^{D} \cdot -0.42°$$

Example 2

About 32.5 g. of crude dextro-rotatory α-hydroxy-β,β-dimethyl-gamma-butyrolactone $$(\alpha)_{30}^{D} \cdot +16.9°$$

mixed with approximately 17.5 g. anhydrous potassium carbonate, are heated at about 125° C. for approximately twenty-four hours. About 50 cc. of water are added and the mixture is then acidified with dilute hydrochloric acid, using Congo red as an indicator. After heating on a steam bath for about one hour, the mixture is then concentrated to dryness under vacuum, extracted with approximately 100 cc. of acetone, filtered, and further extracted with three 50 cc. portions of acetone. The combined acetone filtrates are then concentrated in vacuo upon a steam bath. Yield, about 30.6 g. α-hydroxy-β,β-dimethyl-gamma-butyrolactone, $$(\alpha)_{20}^{D.}+0.65°$$

*Example 3*

About 32.5 g. of crude dextro-rotatory α-hydroxy-β,β-dimethyl-gamma-butyrolactone $$(\alpha)_{20}^{D.}+16.9°$$

mixed with approximately 39.5 g. of barium hydroxide (Ba(OH)$_2$.8H$_2$O), are heated at about 125° C. under reflux for approximately twenty-four hours, cooled, 50 cc. of water are added, and the mixture is then acidified with dilute hydrochloric acid using Congo red as an indicator. After concentration to dryness under vacuo, the mixture is extracted with about 100 cc. of acetone, filtered, washed with three 50 cc. portions of acetone, and the combined acetone filtrates are concentrated under vacuo upon a steam bath. Yield, about 27.9 g. α-hydroxy-β,β-dimethyl-gamma-butyrolactone, $$(\alpha)_{20}^{D.}+14.9°$$

*Example 4*

About 100 g. of dextro-rotatory α-hydroxy-β,β-dimethyl-gamma-butyrolactone $$(\alpha)_{20}^{D.}+21.5°$$

and approximately 40.8 g. of anhydrous sodium carbonate are heated for about twenty-three hours at 125°-130° C. upon an oil bath, suitable means being provided for agitation of the reaction mixture during heating. The mixture is cooled, about 150 cc. of water are added, and the mixture is then agitated until an essentially homogeneous liquid is obtained. After acidification with dilute hydrochloric acid, using Congo red as an indicator, the material is cooled, extracted with fifteen 200 cc. portions of ether, and the combined ether extracts are dried over anhydrous potassium carbonate. The drying agent is removed by filtration and washed with two 200 cc. portions of ether, and the combined ether extracts and washings are then concentrated at atmospheric pressure. After distillation with about 10 cc. of benzene, the remaining solvents are removed by evaporation in vacuo. Yield about 84.3 g. α-hydroxy-β,β-dimethyl-gamma butyrolactone, $$(\alpha)_{20}^{D.}+0.18°$$

The reaction mixture also may be worked up and extracted with acetone as described in Example I.

*Example 5*

About 6.3 g. of crude dextro-rotatory α-hydroxy-β,β-dimethyl-gamma-butyrolactone, $$(\alpha)_{20}^{D.}+16.9°$$

and approximately 8.7 g. of crystalline quinine alkaloid are heated together at approximately 125° C. for about twelve hours, cooled, dissolved in approximately 25 cc. of water, and acidulated with dilute hydrochloric acid using Congo red as an indicator. After adding about 50 cc. of water and forming an essentially homogeneous liquid, the mixture is extracted with seven 50 cc. portions of ether. The ether extracts are combined and distilled with benzene and, after heating under vacuum on a steam bath, the product is obtained. Yield, about 3.8 g. of α-hydroxy-β,β-dimethyl-gamma-butyrolactone, $$(\alpha)_{20}^{D.}+5.7°$$

*Example 6*

About 6.7 g. of crude dextro-rotatory α-hydroxy-β,β-dimethyl-gamma-butyrolactone, $$(\alpha)_{20}^{D.}+16.9°$$

and approximately 9.3 g. of crystalline quinine alkaloid are heated together at approximately 125° C. for about twenty-four hours, cooled, dissolved in approximately 25 cc. of water, and acidulated with dilute hydrochloric acid using Congo red as an indicator. After adding about 50 cc. of water and forming an essentially homogeneous liquid, the mixture is extracted with seven 50 cc. portions of ether. The ether extracts are combined and distilled with benzene, and after heating under vacuum on a steam bath, the product is obtained. Yield, about 4.7 g. α-hydroxy-β,β-dimethyl-gamma-butyrolactone, $$(\alpha)_{20}^{D.}+1.8°$$

The specific optical rotations given in the foregoing examples are based upon examination of solutions of 5% by weight in water.

Modifications may be made in carrying out the present invention without departing from the spirit and scope thereof and the invention is to be limited only by the appended claims.

What is claimed is:

1. The process for racemizing dextro-rotatory-α-hydroxy-β,β-dimethyl - gamma - butyrolactone that comprises heating the lactone, under essentially anhydrous conditions and in the absence of a solvent, with a substance selected from the class consisting of alkali metal carbonates, alkaline earth hydroxides and alkaloids.

2. The process for racemizing dextro-rotatory-α-hydroxy-β,β-dimethyl-gamma - butyrolactone that comprises heating the lactone, under essentially anhydrous conditions and in the absence of a solvent, with a substance selected from the class consisting of alkali metal carbonates, alkaline earth hydroxides and alkaloids, at a temperature above the boiling point of water but below the boiling point of the lactone.

3. The process for racemizing dextro-rotatory-α-hydroxy-β, β-dimethyl-gamma-butylrolactone that comprises heating the lactone, under essentially anhydrous conditions and in the absence of a solvent, with a substance selected from the class consisting of alkali metal carbonates, alkaline earth hydroxides and alkaloids, at a temperature above the boiling point of water but below the boiling point of lactone for a period of at least twelve hours.

4. The process for racemizing dextro-rotatory-α-hydroxy-β,β-dimethyl - gamma - butyrolactone that comprises heating the lactone, under essentially anhydrous conditions and in the absence of a solvent, with a substance selected from the class consisting of alkali metal carbonates, alkaline earth hydroxides and alkaloids, at a temperature of the order of 125° C.

5. The process for racemizing dextro-rotatory-α-hydroxy-β,β-dimethyl - gamma - butyrolactone that comprises heating the lactone, under essentially anhydrous conditions and in the absence of a solvent, with a substance selected from the class consisting of alkali metal carbonates, alkaline earth hydroxides and alkaloids, at a temperature of the order of 125° C. for a period of at least twelve hours.

6. The process for racemizing dextro-rotatory-α-hydroxy-β,β-dimethyl-gamma-butyrolactone that comprises heating the lactone, under essentially anhydrous conditions and in the absence of a solvent, with an alkali metal carbonate.

7. The process for racemizing dextro-rotatory-α-hydroxy-β,β-dimethyl-gamma-butyrolactone that comprises heating the lactone, under essentially anhydrous conditions and in the absence of a solvent, with potassium carbonate.

8. The process for racemizing dextro-rotatory-α-hydroxy-β,β-dimethyl-gamma-butyrolactone that comprises heating the lactone, under essentially anhydrous condition and in the absence of a solvent, with sodium carbonate.

9. The process for racemizing dextro-rotatory-α-hydroxy-β,β-dimethyl-gamma-butyrolactone that comprises heating the lactone, under essentially anhydrous conditions and in the absence of a solvent, with an alkaloid.

10. The process for racemizing dextro-rotatory-α-hydroxy-β,β-dimethyl-gamma-butyrolactone that comprises heating the lactone, under essentially anhydrous conditions and in the absence of a solvent, with quinine.

11. The process for racemizing dextro-rotatory-α-hydroxy-β,β-dimethyl-gamma-butyrolactone that comprises heating the lactone, under essentially anhydrous conditions and in the absence of a solvent, with an alkali metal carbonate at a temperature of the order of 125° C. for at least twelve hours.

12. The process for racemizing dextro-rotatory-α-hydroxy-β,β-dimethyl-gamma-butyrolactone that comprises heating the lactone, under essentially anhydrous conditions and in the absence of a solvent, with potassium carbonate at a temperature of the order of 125° C. for at least twelve hours.

13. The process for racemizing dextro-rotatory-α-hydroxy-β,β-dimethyl-gamma-butyrolactone that comprises heating the lactone, under essentially anhydrous conditions and in the absence of a solvent, with sodium carbonate at a temperature of the order of 125° C. for at least twelve hours.

14. The process for racemizing dextro-rotatory-α-hydroxy-β,β-dimethyl-gamma-butyrolactone that comprises heating the lactone, under essentially anhydrous conditions and in the absence of a solvent, with an alkaloid at a temperature of the order of 125° C. for at least twelve hours.

15. The process for racemizing dextro-rotatory-α-hydroxy-β,β-dimethyl-gamma-butyrolactone that comprises heating the lactone, under essentially anhydrous conditions and in the absence of a solvent, with quinine at a temperature of the order of 125° C. for at least twelve hours.

JOHN WEIJLARD.
JOHN PAUL MESSERLY.